Nov. 17, 1964     G. E. STÅHLBERG     3,157,049
DEVICE FOR MEASURING MOISTURE TEMPERATURE
Filed March 23, 1961
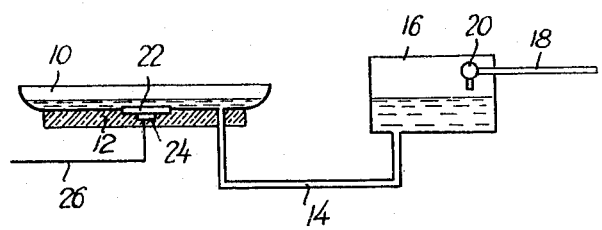
INVENTOR.
Gösta Enoch Ståhlberg
BY
Patent Agent.

United States Patent Office 3,157,049
Patented Nov. 17, 1964

3,157,049
DEVICE FOR MEASURING MOISTURE TEMPERATURE
Gösta Enoch Ståhlberg, Farsta, Sweden, assignor to Regulator Aktiengesellschaft, Glarus, Switzerland, a corporation of Switzerland
Filed Mar. 23, 1961, Ser. No. 97,883
Claims priority, application Sweden, Mar. 25, 1960, 3,014/60
4 Claims. (Cl. 73—335)

The present invention relates to a device for measuring the evaporation temperature of an evaporable component in a flowing gas mixture or stream, for example the moisture temperature of flowing air.

When controlling the moisture of air in premises such as dryers and curing or smoking chambers filled with very unclean air it is difficult continually to measure the moisture content of the air. Moisture impulse devices, based on the use of hygroscopic material, are unsuitable because the impurities in the air are deposited on the hydroscopic means and affect its operation.

Moisture measurement instruments which utilize the psychrometric method are appreciably better for this purpose; in this method the degree of moisture is determined by the difference between the dry and wet temperature of the air, for example by means of two thermometers, of which the one has a measuring member surrounded by a moistened, porous, absorbent material. This material is usually ceramic or constitutes a mantle of cotton or the like. The material, however, is filled up and becomes blocked after a short time by the salts in the water used for moistening it, by impurities in the air, for example dust, resin and tar, and consequently the material on the measuring member must after some time be exchanged.

In order to facilitate this exchange it has previously been proposed to use a textile strip which is placed over a horizontally located measuring member and has its one end dipped in a water container whilst the other end is chucked between two roller-like and turnable feed members; one of these members is provided with a handle so that the strip, by turning the feed members by hand, can be drawn a certain length out of the water container and over the measuring member, the particular length of strip being consequently free from foreign particles. This arrangement, however, requires constant checking and maintenance, and moreover replacement of the used strip.

These disadvantages are eliminated by the device according to the invention featuring the expedients according to which one or more temperature sensitive members are located in a container, the surfaces of the members being free from textile or similar water-absorbent material, and the members being adapted to measure the evaporation temperature in a thin liquid layer of the evaporable component, said layer being exposed to the flowing gas mixture or stream under test, for example moist air.

The invention is explained hereafter in connection with the sole figure of the accompanying drawing which schematically shows a preferred embodiment of the device according to the invention.

The psychrometric measuring device shown in the drawing is intended to measure the moisture temperature of the air alone whilst the dry temperature necessary for measuring the psychrometric difference is measured in any suitable known manner.

The inventive device comprises a container 10 in the form of a flat upwardly open vessel or bowl made of a heat-insulating material, for example of a rigid plastic. The container 10 is mounted on a heat-insulating mounting 12 whose function is to prevent heat transfer from the support member of the container, which may be a bracket, located in flowing air and secured to a ventilation trunk or the like. The container 10 is filled with water and through a pipe 14 communicates with a level regulator 16 in the form of a container fitted with a water supply pipe 18 and a control valve 20 arranged in the latter, the valve being controlled by the water level in the container 16 to maintain the level constant. The valve 20 may, for example, be provided with a float. The water level is so adjusted that a heat-sensitive temperature sensing and transmitting device or element 22 mounted in the bottom of the container 10 is always covered with water. The device is not affected by filling up and blockage to the same extent as for example a mantle and can be easily cleaned.

The temperature senser and transmitter 22 may be in the form of a metal disk with a temperature sensitive member, for example a thermistor 24 fixed below it; the member is connected via a lead 26 to a measuring device for sensing the temperature of member 24 and consequently also of the temperature of the disk 22 and water in the container 10. Instead of the thermistor a metallic-wire temperature senser or some other suitable measuring element may, of course, be used. The temperature of the water in the container 10 may be assumed to be the same everywhere and equal to the moisture temperature of the air, which is measured by the temperature sensers 22, 24. The insulation layer 12 also prevents heat transfer from the surrounding air to the temperature senser 22 and the member 24.

What I claim is:
1. In a device for measuring the evaporation temperature of an evaporable liquid component in a flowing gas stream; a container in the form of a shallow bowl of heat-insulating material, a flat heat-sensitive element in the bottom of the bowl, heat-insulating material covering the bottom of the bowl and thereby insulating the bowl and the heat-sensitive element from thermal influences from below, and means for maintaining a shallow layer of said evaporable component in the bowl and in covering relation with the heat-sensitive element.

2. A device according to claim 1, in which the heat-sensitive element is arranged in the bowl so the depth of the evaporable component over said element is substantially equal to the depth of said component in the bowl.

3. A device according to claim 2, in which the evaporable component is water.

4. In a device for measuring the evaporation temperature of an evaporable liquid component in a flowing gas stream; a container in the form of a shallow bowl of heat-insulating material, a flat heat-sensitive element in the bottom of the bowl, heat-insulating material covering the bottom of the bowl and thereby insulating the bowl and the heat-sensitive element from thermal influences from below, and a constant-level source of the evaporable component connected to the bowl for constantly maintaining a shallow layer of predetermined depth of said component in the bowl.

References Cited in the file of this patent

UNITED STATES PATENTS

| | | |
|---|---|---|
| 871,163 | Cramer | Nov. 19, 1907 |
| 1,890,565 | Austin | Dec. 13, 1932 |
| 2,302,528 | Conklin | Nov. 17, 1942 |
| 2,603,972 | Kahn | July 22, 1952 |
| 2,818,482 | Bennett | Dec. 31, 1957 |

FOREIGN PATENTS

| | | |
|---|---|---|
| 553,831 | Belgium | Jan. 15, 1957 |

OTHER REFERENCES

Publication: "Electronic Equipment," an article "How to Use Thermistors," June 1956, page 38.